US011514566B2

(12) United States Patent
Otokawa et al.

(10) Patent No.: US 11,514,566 B2
(45) Date of Patent: Nov. 29, 2022

(54) CIGARETTE FILTER INSPECTION METHOD, CIGARETTE FILTER INSPECTION APPARATUS, AND CIGARETTE FILTER INSPECTION PROGRAM

(71) Applicant: JAPAN TOBACCO INC., Tokyo (JP)

(72) Inventors: Takuya Otokawa, Tokyo (JP); Kazumasa Arae, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 182 days.

(21) Appl. No.: 16/899,232

(22) Filed: Jun. 11, 2020

(65) Prior Publication Data

US 2020/0302594 A1    Sep. 24, 2020

Related U.S. Application Data

(63) Continuation of application No. PCT/JP2017/045131, filed on Dec. 15, 2017.

(51) Int. Cl.
*G06T 7/00* (2017.01)
*G06T 7/13* (2017.01)
(Continued)

(52) U.S. Cl.
CPC .......... *G06T 7/0004* (2013.01); *A01J 25/117* (2013.01); *A24C 5/34* (2013.01); *A24C 5/3412* (2013.01);
(Continued)

(58) Field of Classification Search
CPC .......... G06T 7/0004; G06T 7/62; G06T 7/50; G06T 7/13; G06T 2207/10152;
(Continued)

(56) References Cited

U.S. PATENT DOCUMENTS

| 2002/0110271 A1 | 8/2002 | Sasaki et al. |
| 2004/0156533 A1* | 8/2004 | Hatakeyama ............. G06T 7/66 382/109 |

(Continued)

FOREIGN PATENT DOCUMENTS

| JP | 2002-243656 A | 8/2002 |
| JP | 2002-267428 A | 9/2002 |

(Continued)

OTHER PUBLICATIONS

International Search Report, issued in PCT/JP2017/045131, dated Feb. 13, 2018.

*Primary Examiner* — Jamil Ahmed
(74) *Attorney, Agent, or Firm* — Birch, Stewart, Kolasch & Birch, LLP

(57) ABSTRACT

A cigarette filter inspection method of inspecting a solid flavor element to be disposed in a void between two filter plugs placed in outer filter wrapper, and the cigarette filter inspection method includes an illumination step of irradiating the void with illumination light, an imaging step of obtaining an inspection image of a region containing the void, a filler detection step of detecting the flavor element based on contrast between the void and the flavor element in the inspection image, and an inspection step of inspecting the flavor element detected in the inspection image.

22 Claims, 10 Drawing Sheets

(51) Int. Cl.
| | |
|---|---|
| *G06T 7/50* | (2017.01) |
| *G06T 7/62* | (2017.01) |
| *A24C 5/34* | (2006.01) |
| *A24D 3/02* | (2006.01) |
| *A24D 3/04* | (2006.01) |
| *G01B 11/24* | (2006.01) |
| *A47K 3/16* | (2006.01) |
| *A01J 25/11* | (2006.01) |
| *G01N 21/88* | (2006.01) |

(52) U.S. Cl.
CPC ........... *A24D 3/0295* (2013.01); *A24D 3/048* (2013.01); *A47K 3/1615* (2013.01); *G01B 11/2408* (2013.01); *G01N 21/88* (2013.01); *G01N 21/8851* (2013.01); *G06T 7/13* (2017.01); *G06T 7/50* (2017.01); *G06T 7/62* (2017.01); *G01N 2021/8887* (2013.01); *G06T 2207/10152* (2013.01); *G06T 2207/30108* (2013.01)

(58) Field of Classification Search
CPC ......... G06T 2207/30108; A01J 25/117; A24C 5/34; A24C 5/3412; A24D 3/0295; A24D 3/048; A47K 3/1615; G01B 11/2408; G01N 21/88; G01N 21/8851; G01N 2021/8887

See application file for complete search history.

(56) References Cited

U.S. PATENT DOCUMENTS

| | | | |
|---|---|---|---|
| 2004/0252294 A1 | 12/2004 | Hathaway | |
| 2009/0202141 A1* | 8/2009 | Sasaki | G06T 7/0004 382/145 |
| 2012/0327227 A1* | 12/2012 | Ikeda | G01N 21/958 348/143 |

FOREIGN PATENT DOCUMENTS

| | | | | |
|---|---|---|---|---|
| JP | 2005-292081 A | 10/2005 | | |
| JP | 2005292081 A | * 10/2005 | | G01N 21/95 |
| JP | 2013-7597 A | 1/2013 | | |
| JP | 2015-197396 A | 11/2015 | | |
| JP | 2015197396 A | * 11/2015 | | G01N 21/892 |
| JP | 2016-90309 A | 5/2016 | | |
| JP | 2016090309 A | * 5/2016 | | G01N 21/88 |
| WO | WO 2013/145163 A1 | 10/2013 | | |
| WO | WO-2013145163 A1 | * 10/2013 | | G01N 21/88 |

* cited by examiner

CIGARETTE FILTER INSPECTION METHOD, CIGARETTE FILTER INSPECTION APPARATUS, AND CIGARETTE FILTER INSPECTION PROGRAM

CROSS REFERENCE TO RELATED APPLICATIONS

This application is a Continuation of PCT International Application No. PCT/JP2017/045131, filed on Dec. 15, 2017, which is hereby expressly incorporated by reference into the present application.

TECHNICAL FIELD

The present invention relates to a cigarette filter inspection method of inspecting a filler to be disposed in a cigarette, a cigarette filter inspection apparatus, and a cigarette filter inspection program.

BACKGROUND ART

It is known that a filter cigarette comprises a filler such as a flavor capsule in a filter of a cigarette. In general, the flavor capsule to be disposed in the filter cigarette has a spherical shape containing liquid flavor and is colored in blue or the like that is, for example, an image color of menthol. A filter manufacturing machine that manufactures a filter containing such a flavor capsule includes a capsule supply device that supplies the flavor capsule in a space among a large number of filter elements placed on shaping paper to form a filter element row, and an example of this supply device is disclosed in Patent Document 1.

Here, the above-described capsule supply device is set so that one flavor capsule is disposed per cigarette. Furthermore, in the above filter manufacturing machine disclosed in Patent Document 1, in a case where a quantity or shape of flavor capsules is different from a desired state, the corresponding flavor capsule is determined as a defective product and eliminated from a manufacturing line. More specifically, in the filter manufacturing machine of Patent Document 1, in an inspection image photographed with a color camera, a region of the same color as in a preset color sample is detected as the flavor capsule, to determine the shape of the flavor capsule.

PRIOR ART DOCUMENT

Patent Document
Patent Document 1: International Publication No. WO2013/145163

SUMMARY OF THE INVENTION

Problems to be Solved by the Invention

However, a filler of flavor to be disposed in a filter is not limited to a colored capsule, and may be, for example, a flavor element in which white powder is hardened. Furthermore, in a case where a filter component such as a filter plug or shaping paper constituting the filter has the same color as in the flavor element, in an inspection based on such a color sample as in Patent Document 1 described above, there is concern that accuracy in detecting a boundary between the filter component and the flavor element decreases and that a quality of the filler cannot be determined based on a shape.

The present invention has been developed in view of such problems, and an object thereof is to provide a cigarette filter inspection method, a cigarette filter inspection apparatus and a cigarette filter inspection program in each of which a quality of a filler can be determined even in a case where the filler to be disposed in a filter component has the same color as in the filter component.

Means for Solving the Problems

In order to achieve the above object, a cigarette filter inspection method according to the present invention is a cigarette filter inspection method of inspecting a solid filler to be disposed in a void between two members placed in shaping paper, the cigarette filter inspection method comprising an illumination step of irradiating the void with illumination light, an imaging step of obtaining an inspection image of a region containing the void, a filler detection step of detecting the filler based on contrast between the void and the filler in the inspection image, and an inspection step of inspecting the filler detected in the inspection image.

A cigarette filter inspection apparatus according to the present invention is a cigarette filter inspection apparatus that inspects a solid filler to be disposed in a void between two members placed in shaping paper, the cigarette filter inspection apparatus comprising an illumination device that irradiates the void with illumination light, an imaging device that obtains an inspection image of a region containing the void, and an image processing device including filler detection means for detecting the filler based on contrast between the void and the filler in the inspection image, and inspection means for inspecting the filler detected in the inspection image.

A cigarette filter inspection program according to the present invention is a cigarette filter inspection program to inspect a solid filler to be disposed in a void between two members placed in shaping paper, the cigarette filter inspection program causing a computer to execute image obtaining means for obtaining an inspection image of a region containing the void, filler detection means for detecting the filler based on contrast between the void and the filler in the inspection image, and inspection means for inspecting the filler detected in the inspection image.

Advantageous Effects of the Invention

According to a cigarette filter inspection method, a cigarette filter inspection apparatus, and a cigarette filter inspection program of the present invention, a quality of a filler can be determined, even in a case where a filler to be disposed in a filter component and the filter component have the same color.

MODE FOR CARRYING OUT THE INVENTION

Hereinafter, embodiments of the present invention will be described in detail with reference to the drawings. Note that the present invention is not limited to a content described hereinafter, and can be arbitrarily changed and implemented without departing from scope of the invention. Furthermore, any of the drawings for use in description of the embodiments schematically show constituting members, are partially emphasized, enlarged, reduced, omitted or otherwise shown to deepen understanding, and may not accurately represent scales, shapes or the like of the constituting members.

First Embodiment

Figure 1:
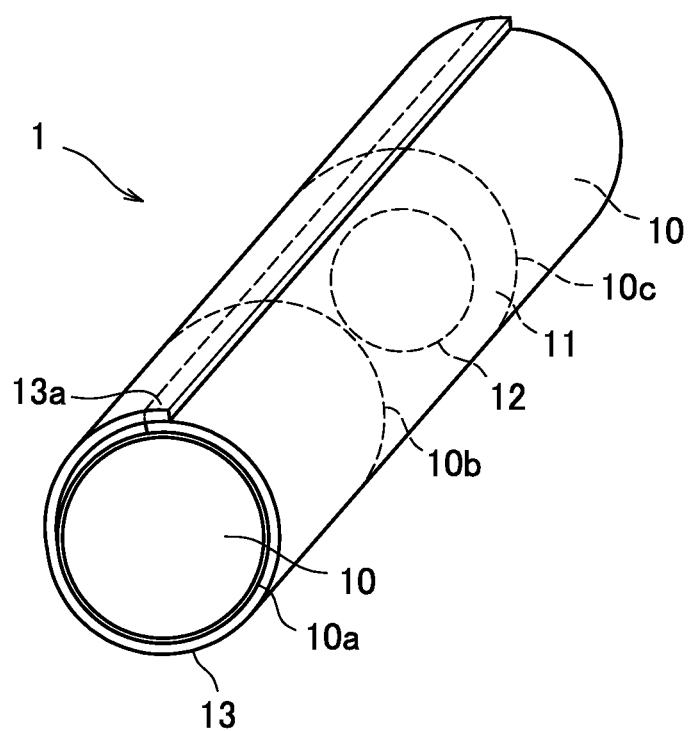
FIG. 1 is a perspective view showing a cigarette filter as an inspection object of a cigarette filter inspection method according to the present invention.

Description will be made as to a cigarette filter inspection method, a cigarette filter inspection apparatus, and a cigarette filter inspection program according to a first embodiment of the present invention. FIG. 1 is a perspective view showing a cigarette filter 1 as an inspection object of a cigarette filter inspection according to the present invention. The cigarette filter 1 comprises filter plugs 10, a void 11, a flavor element 12 as a "solid filler", and outer filter wrapper 13.

The filter plugs 10 are columnar filter materials, i.e., acetate fiber tows, and are arranged as "two members" at positions away from each other in one cigarette filter 1 in the present embodiment. Furthermore, in the present embodiment, each filter plug 10 has a columnar side surface wound with white inner filter wrapper 10a. Note that the filter plug 10 may be provided with one or more through holes, and a groove may be formed in the side surface of the plug. Furthermore, the "two members" in the present invention are not limited to such filter plugs 10 as described above, and may be, for example, plastic members or metal members as long as the members are arranged in such a way as to sandwich the void 11 described later.

The void 11 is a hollow space formed by arranging two filter plugs 10 away from each other, and formed between an inner side surface 10b of one filter plug 10 and an inner side surface 10c of the other filter plug 10. That is, the cigarette filter 1 is constituted as a so-called triple filter.

The flavor element 12 in the present embodiment is a sphere formed by hardening white flavor powder and having a diameter of 1.0 to 7.0 mm, and is disposed in the void 11. However, the flavor element 12 is not limited to this aspect, and may be a capsule including a liquid flavor material.

The outer filter wrapper 13 is a shaping member to integrally form a filter component including two filter plugs 10 and the flavor element 12 disposed in the void 11 into a rod. The outer filter wrapper 13 is wrapped around the columnar side surface of the filter component, and glued in a wrapped portion 13a in which a winding end portion is superimposed on a winding start portion.

Thus, the flavor element 12 in the present embodiment is disposed in the void 11 of an inner portion of the filter component comprising the two filter plugs 10 and the outer filter wrapper 13.

Figure 2:
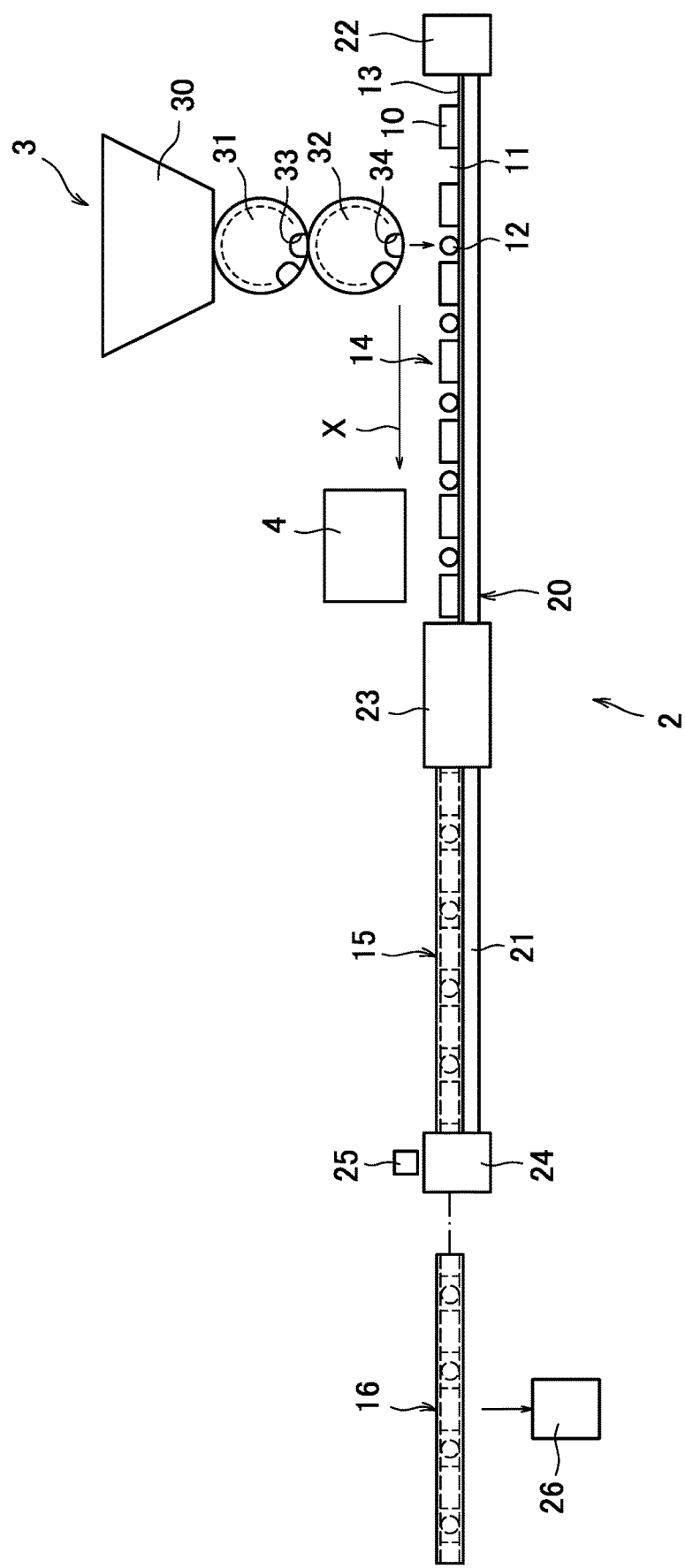
FIG. 2 is a schematic view schematically showing a manufacturing process of a cigarette filter.

FIG. 2 is a schematic view schematically showing a manufacturing process of the cigarette filter 1. Specifically, FIG. 2 shows a filter manufacturing device 2 that manufactures the cigarette filter 1, a flavor element supply device 3 that supplies the flavor element 12 to the filter manufacturing device 2, and a cigarette filter inspection apparatus 4 that inspects the flavor element 12 supplied to the filter manufacturing device 2.

First, the filter manufacturing device 2 as a manufacturing line will be described. The filter manufacturing device 2 comprises an upstream conveyor 20, a downstream conveyor 21, a plug supply device 22, a wrapping section 23, a cutting section 24, an encoder 25, and a removal processing unit 26.

The upstream conveyor 20 and the downstream conveyor 21 form the horizontally extending manufacturing line, and convey a constituting material of the cigarette filter 1 in the manufacturing process continuously in an orientation shown in an arrow X direction. Here, a series of outer filter wrapper 13 is supplied from an unshown roll on an upstream side of the upstream conveyor 20. Furthermore, as will be described later, the upstream conveyor 20 has a U-shaped internal bottom surface schematically shown in a planar shape in FIG. 2 to show, for example, an internal state of arrangement of the filter plug 10 and the flavor element 12.

The plug supply device 22 places the filter plugs 10 via an equal interval on the outer filter wrapper 13 to be supplied to the upstream conveyor 20, to form a filter element row 14. Here, the space between the filter plugs 10 in the filter element row 14 forms the void 11 of the cigarette filter 1. Note that in the filter element row 14, as will be described later, the flavor elements 12 are supplied to the spaces among a plurality of filter plugs 10, and a quality inspection of the flavor element 12 in the void 11 is performed.

Here, the individual filter plug 10 to be supplied from the plug supply device 22 to the upstream conveyor 20 is supplied with a length of two combined filter plugs 10 of the cigarette filter 1 shown in FIG. 1, and is divided into two plugs in a subsequent step. Consequently, the filter plug 10 to be supplied from the plug supply device 22 is the filter plug 10 on an upstream side of the cigarette filter 1 to be first manufactured, and the filter plug 10 on a downstream side of the cigarette filter 1 to be later manufactured in two cigarette filters 1 to be continuously manufactured.

The wrapping section 23 forms the outer filter wrapper 13 continuously conveyed from the upstream conveyor 20 into a cylindrical shape by use of an unshown known garniture tape, thereby continuously wrapping the filter components, i.e., the filter element row 14 and the flavor elements 12 with the outer filter wrapper 13. Consequently, the wrapping section 23 forms a filter rod continuous body 15 to be sent out to the downstream conveyor 21.

The cutting section 24 cuts the filter rod continuous body 15 conveyed from the downstream conveyor 21 into each predetermined length, to manufacture a filter rod 16. Here, the filter rod 16 has a length that is a plurality of times, four times in the present embodiment as long as a length of the cigarette filter 1 for use in a cigarette. The manufactured filter rod 16 is conveyed to an unshown filter mounting machine to be connected to a cigarette main body, for use in manufacturing the cigarette.

The encoder 25 is a sensor provided to specify a cutting position for the cutting section 24 that cuts the filter rod continuous body 15, and monitors a position of the continuously conveyed filter rod continuous body 15. Furthermore, the encoder 25 sequentially transmits a conveyance position signal indicating the cutting position of the filter rod continuous body 15 to the cigarette filter inspection apparatus 4.

The removal processing unit 26 removes the filter rod 16 including the flavor element 12 determined as a no-good product by the cigarette filter inspection apparatus 4 as described later in detail. Herein in the present embodiment, the filter rod 16 including even one flavor element 12 determined as the no-good product is removed, but the cigarette filter 1 including the no-good product may only be removed, after the filter rod 16 is cut into the individual cigarette filters 1.

Next, description will be made as to the flavor element supply device 3 that supplies the flavor element 12 to the filter element row 14 in the upstream conveyor 20. The flavor element supply device 3 comprises a hopper 30, a first rotating wheel 31, and a second rotating wheel 32, and is disposed above the upstream conveyor 20 in a vertical direction.

The hopper 30 is a receiving unit to receive the spherical flavor element 12 to be continuously supplied to the filter element row 14.

The first rotating wheel 31 is a rotating body including a horizontal rotary shaft, and is provided with a plurality of pockets 33 along an outer periphery. Furthermore, each of individual pockets 33 receives each flavor element 12 from the hopper 30 when an opening is turned upward in the vertical direction, and supplies each flavor element 12 to the second rotating wheel 32 when the opening is turned downward in the vertical direction. The first rotating wheel 31 has a rotational speed set so that the flavor element 12 can be stably supplied from the hopper 30 to the second rotating wheel 32.

The second rotating wheel 32, similarly to the first rotating wheel 31, is a rotating body including a horizontal rotary shaft, and is provided with a plurality of pockets 34 along an outer periphery. Furthermore, each of individual pockets 34 receives each flavor element 12 from the first rotating wheel 31 when an opening is turned upward in the vertical direction, and drops and supplies each flavor element 12 to a space between the filter plugs 10 when the opening is turned downward in the vertical direction. Consequently, the second rotating wheel 32 has a rotational speed set in accordance with a conveying speed of the upstream conveyor 20.

Subsequently, description will be made as to the cigarette filter inspection apparatus 4 that inspects a quality of the flavor element 12 supplied to the filter element row 14. The cigarette filter inspection apparatus 4 is disposed between the flavor element supply device 3 and the wrapping section 23, and inspects the quality of the flavor element 12 in accordance with an image obtained by photographing, directly above the upstream conveyor 20, the flavor element 12 before the element is wrapped with the outer filter wrapper 13.

Figure 3:
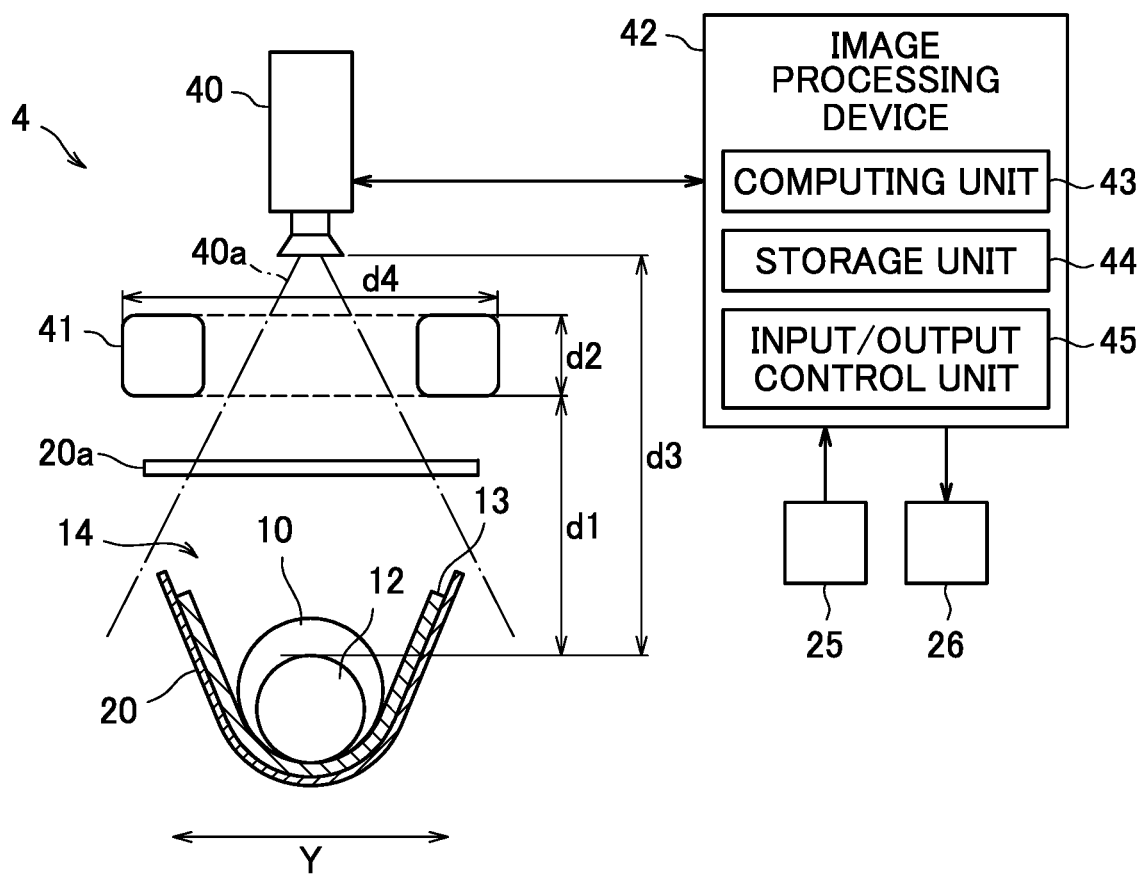
FIG. 3 is a schematic configuration view showing a configuration of a cigarette filter inspection apparatus.

FIG. 3 is a schematic configuration view showing a configuration of the cigarette filter inspection apparatus 4. The cigarette filter inspection apparatus 4 comprises a camera 40 as an "imaging device", an illumination device 41, and an image processing device 42. FIG. 3 shows a cross section in a case where the filter component including the flavor element 12 disposed as the inspection object is seen from a conveying direction X. Note that an arrow Y of FIG. 3 shows a direction vertical to the conveying direction X, and indicates a width direction of the upstream conveyor 20.

Here, the upstream conveyor 20 includes a U-shaped cross section in the width direction shown by the arrow Y, and the outer filter wrapper 13 is placed along an inner bottom surface of the upstream conveyor 20. Consequently, the filter plug 10 and the flavor element 12 arranged on the outer filter wrapper 13 are located near a center of the upstream conveyor 20 to the width direction Y.

The camera 40 photographs the void 11 between the filter element rows 14 as described later at a timing based on an imaging instruction signal received from the image processing device 42 (an imaging step). Furthermore, the camera 40 is disposed so that a width of the upstream conveyor 20 falls in an angle 40a of view, and photographs a region containing the void 11 via a transparent acrylic plate 20a.

Here, the acrylic plate 20a is an upper cover of the upstream conveyor 20, and prevents the conveyed filter element row 14 and flavor element 12 from jumping out from the upstream conveyor 20. Furthermore, the acrylic plate 20a protects, from surrounding dust or the like, the filter element row 14 and the flavor element 12 that are conveyed in the upstream conveyor 20. Note that the acrylic plate 20a is not an indispensable component for the present invention, and may be used as a part of the upstream conveyor 20 or does not have to be used.

The illumination device 41 is, for example, an LED light, and is a light source disposed between the camera 40 and the upstream conveyor 20 to irradiate an imaging region of the upstream conveyor 20 with illumination light. Furthermore, the illumination device 41 is formed in such an annular shape as to surround the angle 40a of view of the camera 40, and is focused on the flavor element 12 to irradiate the element with the illumination light (an illumination step). That is, the camera 40 images the void 11 as the imaging region via an aperture of the illumination device 41 formed in the annular shape.

Here, shapes and arrangement of the camera 40 and the illumination device 41 are set so that the camera and the device can image the spherical flavor element 12 in a state of being focused on the surface of the element to be irradiated with the illumination light. For example, in the present embodiment, a distance d1 from the surface of the flavor element 12 to the illumination device 41 is set to 30 mm, a width d2 of the illumination device 41 in the vertical direction is set to 17 mm, a distance d3 from the surface of the flavor element 12 to the camera 40 is set to 200 mm, and a width d4 of the illumination device 41 in the horizontal direction is set to 50 mm.

The image processing device 42 is a computer that processes an image photographed by the camera 40 to inspect the quality of the flavor element 12, and comprises a computing unit 43, a storage unit 44, and an input/output control unit 45. The image processing device 42 may be a general-purpose PC, or may be constituted as embedded equipment.

The computing unit 43 is a central processing unit (CPU) that processes the image, and executes an inspection program as will be described later. Furthermore, the computing unit 43 controls the storage unit 44 and the input/output control unit 45, and inputs and outputs signals into and from peripherals connected to an exterior of the image processing device 42 via the input/output control unit 45.

The storage unit 44 is constituted of memories such as a ROM and a RAM, and stores the inspection program to be executed by the computing unit 43. Furthermore, the storage unit 44 also functions as a cache memory that temporarily stores data to be computed during the execution of the inspection program.

The input/output control unit 45 is an interface that is connected to the camera 40, the encoder 25, and the removal processing unit 26 and that inputs and outputs signals into and from the respective peripherals of the image processing device 42. More specifically, the input/output control unit 45 receives the conveyance position signal indicating the cutting position of the filter rod continuous body 15, the signal being input from the encoder 25. At this time, the computing unit 43 calculates, based on the conveyance position signal and the conveying speed, a timing when the void 11 having the flavor element 12 disposed therein is conveyed to a position directly below the camera 40, and transmits the imaging instruction signal to the camera 40 via the input/output control unit 45. Then, the input/output control unit 45 takes in the image photographed by the camera 40, specifies the flavor element 12 determined as the no-good product by the inspection program based on the image, and transmits, to the removal processing unit 26, a removal instruction signal to remove the no-good product.

Note that the input/output control unit 45 inputs and outputs the signals into and from these peripherals in a case where a peripheral other than the above peripherals, for example, a display, a keyboard, a mouse or an external storage device is connected to the image processing device 42.

Next, description will be made as to the inspection program to be executed by the computing unit 43 of the image processing device 42. The image processing device 42 executes the inspection program to the obtained image, and determines the quality of the flavor element 12, every time the device obtains the image from the camera 40. Here, the inspection program includes inspection region setting means, filler detection means, and inspection means as will be described later.

Figure 4:
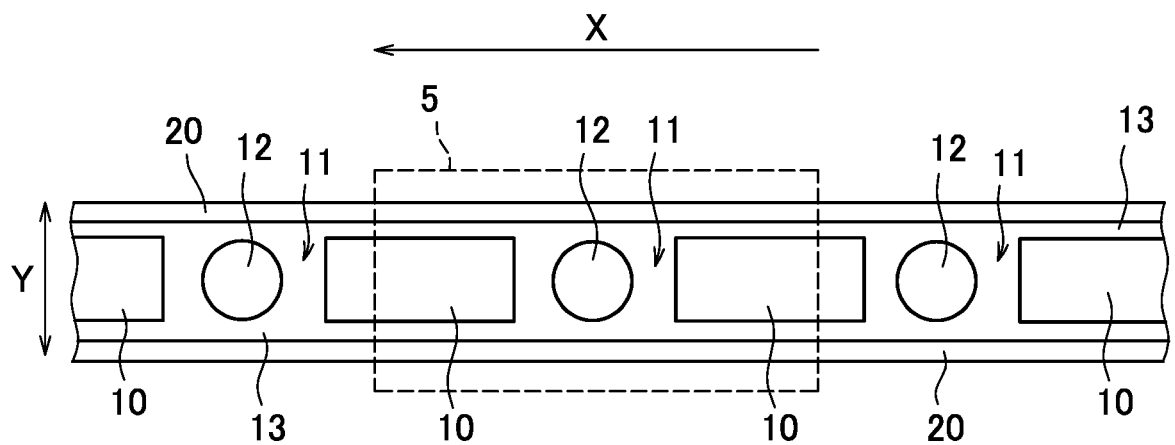
FIG. 4 is a top view of an upstream conveyor.

FIG. 4 is a top view of the upstream conveyor 20. Here, since the image processing device 42 transmits the imaging instruction signal at the timing when the void 11 is conveyed to the position directly below the camera 40 as described above, an inspection image 5 of a region containing the void 11 is obtained from the camera 40 as shown by a broken line of FIG. 4. That is, the inspection image 5 is an image of a region including a part of each of the filter plugs 10 arranged around the void 11 on opposite sides in the conveying direction X, and opposite ends of the upstream conveyor 20 in the width direction Y.

Figure 5:
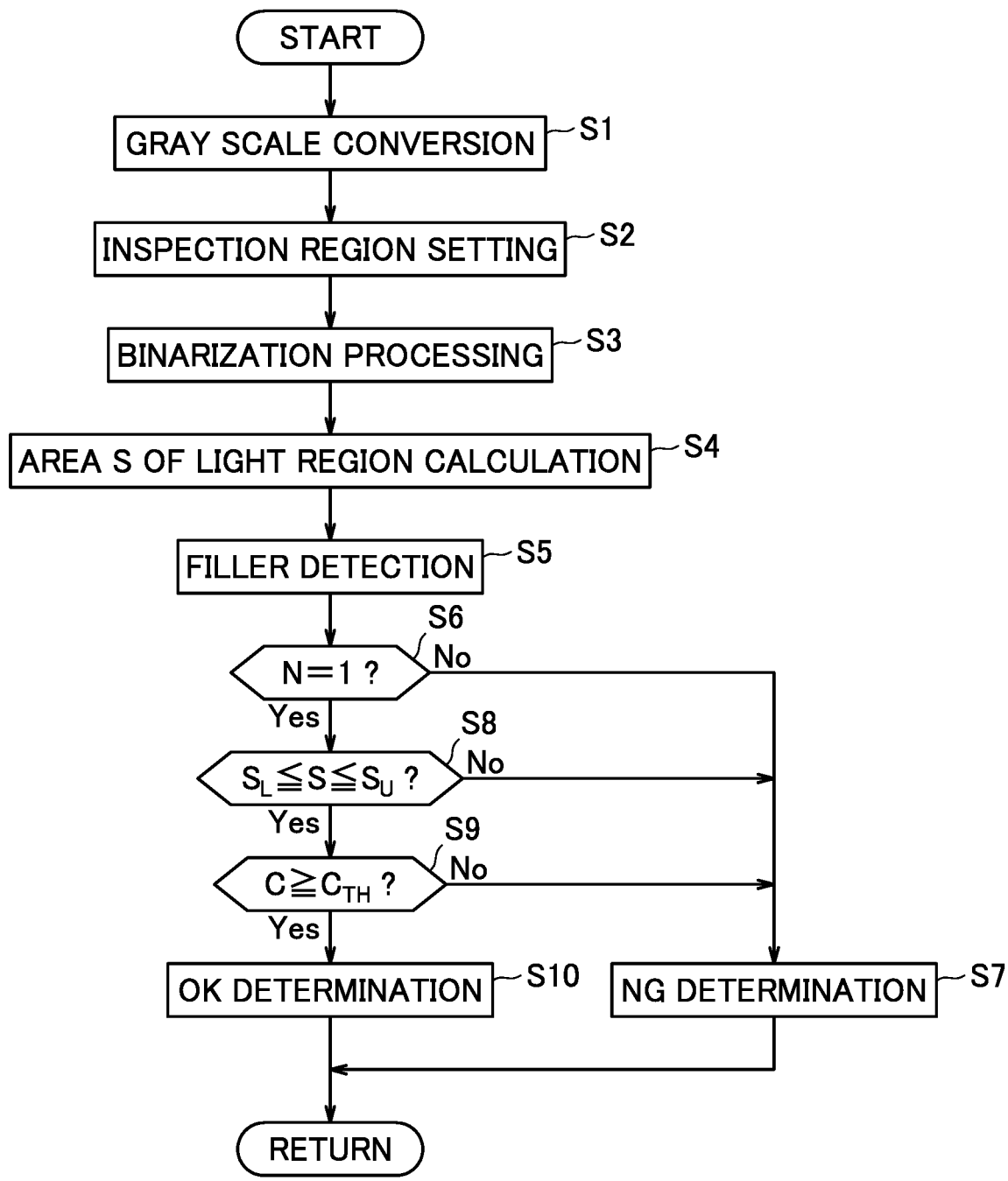
FIG. 5 is a flowchart showing execution procedures of an inspection program according to a first embodiment.

FIG. 5 is a flowchart showing execution procedures of the inspection program according to the first embodiment. The computing unit 43 obtains the inspection image 5 via the input/output control unit 45, to start the inspection program.

When the inspection program is started, the obtained inspection image 5 is read (image obtaining means), and the color inspection image 5 is converted to a gray scale image (step S1). In the present embodiment, the gray scale image is constituted by 256 shade levels of luminance information. Note that in a case where the read inspection image 5 is already the gray scale image, the procedure of the step S1 is omitted.

Figure 6:
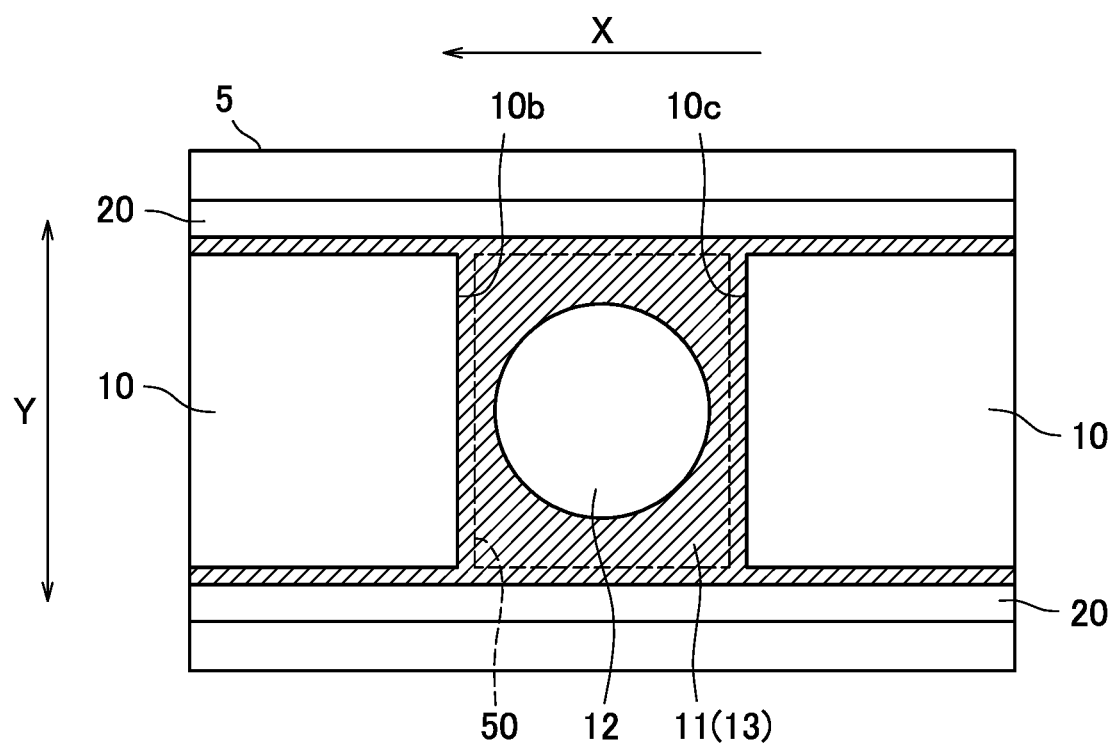
FIG. 6 is a schematic view showing an inspection region set in an inspection image.

When the inspection image 5 is converted to the gray scale image, an inspection region 50 to detect the inspection object is set in the gray scale image (step S2, an inspection region setting step, or inspection region setting means). Here, FIG. 6 is a schematic view showing the inspection region 50 set in the inspection image 5. In the present embodiment, the outer filter wrapper 13 seen in the back of the void 11, the flavor element 12 and the filter plugs 10 have the same color (white), and the surfaces of the flavor element 12 and the filter plugs 10 that are close to the camera 40 are relatively brightly imaged, while a shadow is formed in the outer filter wrapper 13 in the void 11, so that the paper is relatively darkly imaged. Consequently, in the gray scale inspection image 5, a boundary between respective imaging objects can be detected as a boundary of contrast.

The inspection region 50 in the inspection image 5 is set in the void 11 in which the flavor element 12 as the inspection object is disposed. More specifically, the inspection region 50 is set to the width of the filter plug 10 in the width direction Y of the upstream conveyor 20 between two boundaries each of which is between the void 11 and the upstream conveyor 20. Here, each filter plug 10 moves only in the conveying direction X to the angle 40a of view of the camera 40, and hence a position of the plug does not change in the width direction Y of the upstream conveyor 20 in the inspection image 5. Consequently, the boundaries of the inspection region 50 in the width direction Y can be set in advance as fixed lines in the inspection image 5.

On the other hand, the boundary of the inspection region 50 in the conveying direction X may slightly shift every imaging, due to an error in timing to image the inspection image 5, or the like, and hence the boundary is set based on each inspection image 5. In more detail, the boundary of the inspection region 50 in the conveying direction X is detected based on a difference in brightness that is based on a difference in depth seen from the camera 40 between the filter plug 10 and the outer filter wrapper 13 as a background in the void 11. For example, in a case where the difference in brightness is sequentially calculated from a downstream side toward an upstream side in the conveying direction X, the brightness changes from lightness to darkness in an inner side surface 10b of the filter plug 10 on the downstream side, so that a position of the inner side surface 10b can be detected.

Here, the boundary of the inspection region 50 in the conveying direction X is set to a position with a margin from the inner side surface 10b detected as described above on an inner side of the void 11. In the present embodiment, the margin is set to 0.3 mm. Consequently, the boundary of the inspection region 50 in the conveying direction X suppresses a drop in inspection accuracy that is caused by reflection of the filter plug 10 in the inspection region 50 due to the error or the like. Note that the boundary of the inspection region 50 is also set in the same manner on an inner side surface 10c side of the other filter plug 10.

Returning to FIG. 5, upon completion of the setting of the inspection region 50 in the step S2, binarization processing of setting, to 1, a light region having a threshold luminance $B_{TH}$ or more and setting, to 0, a dark region having a luminance less than the threshold luminance $B_{TH}$ is performed on the inspection region 50 in the gray scale image, to generate binary data (step S3).

Here, the threshold luminance $B_{TH}$ as a "binarization threshold" may be set for each inspection image 5, and may be a fixed value that is set in advance. In the former case, the threshold luminance $B_{TH}$ can be set as, for example, a value obtained by measuring, in advance, a maximum luminance $B_{MAX}$ in the inspection region 50 in a case where the flavor element 12 is not disposed in the void 11, and adding, to the maximum luminance $B_{MAX}$, a difference luminance obtained by subtracting, from the maximum luminance $B_{MAX}$, an average luminance $B_A$ of the gray scale image in the inspection region 50 of the inspection image 5, that is, $B_{TH}=2B_{MAX}-B_A$. Thus, the threshold luminance $B_{TH}$ is set based on the average luminance $B_A$ adaptively for each inspection image 5, so that the binarization processing can be stably performed also on fluctuations of illumination conditions or the like.

Subsequently, an area S of a lump of light region included in the binary data is calculated (step S4). Here, if a plurality of lumps of light regions are present, the area S is calculated for each of the plurality of light regions.

Then, if the area S of the lump of light region in the inspection region 50 is a predetermined threshold area $S_{TH}$ or more, the light region is detected as the flavor element 12 (step S5, a filler detection step, or filler detection means). In cases including a case where the flavor element 12 is not detected and a case where a plurality of flavor elements 12 are detected, a quantity N of the flavor elements 12 in the inspection region 50 is calculated. On the other hand, if the light region has an area less than the threshold area $S_{TH}$, the light region is regarded as noise and excluded from the inspection object.

Here, the threshold area $S_{TH}$ is a threshold arbitrarily set in advance to remove the noise wrongly calculated as a micro light region due to the illumination conditions, an error in computation, and the like. For example, the threshold area $S_{TH}$ can be set to 1% of an average value of areas S, by obtaining, in advance, the areas S of a plurality of flavor elements 12 each having a quality known to be excellent. Alternatively, the threshold area $S_{TH}$ may be set to 1% of the area of the light region in a case where the flavor element 12 has a size as prescribed.

Figure 7A:
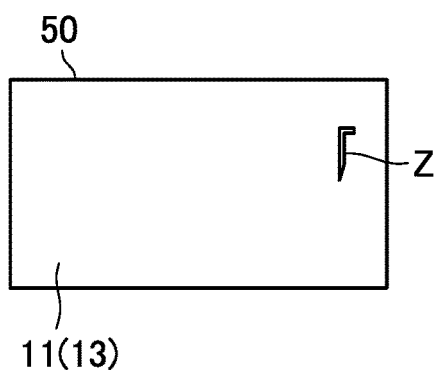
FIG. 7A shows an image of the inspection region in a case where a filler is determined as no good.

FIG. 7A to FIG. 7D show images of the inspection region 50 in a case where a filler is determined as no good. FIG. 7A shows an example where the flavor element 12 is not disposed in the inspection region 50, and noise is detected as a micro light region shown by Z. That is, the micro light region Z is excluded from the inspection object in accordance with the above-described threshold area $S_{TH}$.

Subsequently, inspection means for inspecting the quality of the flavor element 12 detected in the inspection region 50 is executed (an inspection step). The inspection means includes quantity determination means for determining whether or not the quantity of the detected flavor elements 12 is proper, and shape determination means (a shape determination step) for determining whether or not a shape of the detected flavor element 12 is proper. The quantity determination means determines whether or not the quantity N of the flavor elements 12 in the inspection region 50 is 1 (step S6, a quantity determination step). That is, if the quantity N is 1, it is considered that one flavor element 12 is only disposed in the void 11, and it is determined that the quantity N of the flavor elements 12 is proper.

Figure 7B:
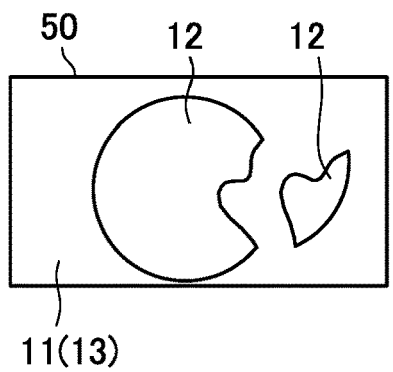
FIG. 7B shows an image of the inspection region in a case where the filler is determined as no good.
Figure 7C:
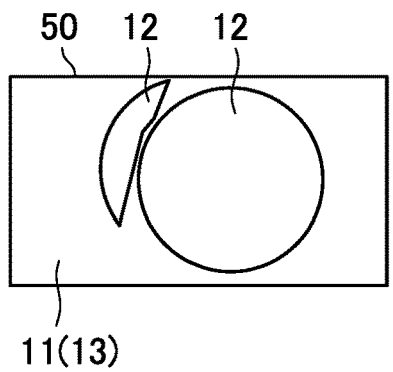
FIG. 7C shows an image of the inspection region in a case where the filler is determined as no good.

On the other hand, if the quantity N is not 1 (no in the step S6), for example, it is considered that the flavor element 12 is not in the void 11 as shown in FIG. 7A, the flavor element 12 is cracked into a plurality of elements as shown in FIG. 7B, or one flavor element 12 and a fragment of the other flavor element 12 are included as shown in FIG. 7C. Thus, it is determined that the quantity of the flavor elements 12 is not proper, and it is therefore determined that the flavor element is the no-good (NG) product (step S7). Upon determining that the flavor element 12 is the no-good product, the inspection program to the inspection image 5 ends (return).

If it is determined that the quantity N of the flavor elements 12 in the inspection region 50 is proper (yes in the step S6), it is determined whether or not the area S of the flavor element 12 calculated in the step S5 is within a predetermined range set beforehand. That is, it is determined whether or not the area S is a predetermined lower limit value $S_L$ or more and a predetermined upper limit value $S_U$ or less (step S8).

Figure 7D:
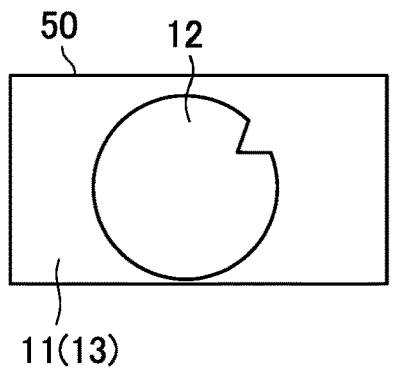
FIG. 7D shows an image of the inspection region in a case where the filler is determined as no good.

Here, the lower limit value $S_L$ and the upper limit value $S_U$ are thresholds arbitrarily set in advance to prescribe an acceptable range of the size of one flavor element 12. That is, if the area S is less than the lower limit value $S_L$, it is assumed that the flavor element 12 is chipped or cracked, for example, as shown in FIG. 7D, and if the area S is in excess of the upper limit value $S_U$, it is assumed that, for example, a plurality of flavor elements 12 are detected as a lump of light region. Consequently, if the area S of the inspection object is not within the predetermined range set beforehand (no in the step S8), it is determined that the size of the flavor element 12 is not proper and that the flavor element is a no-good (NG) product (the step S7). A range defined by the lower limit value $S_L$ and the upper limit value $S_U$ is set to be, for example, from 50 to 150%, preferably from 80 to 120% of the prescribed area of the flavor element 12.

If the area S of the flavor element 12 is within the predetermined range set beforehand (yes in the step S8), it is next determined whether or not a circularity C of the flavor element 12 is a predetermined circularity threshold $C_{TH}$ or more (step S9). Here, the circularity C is calculated by an equation of $C=4\pi S/L^2$ in which the area S is used, L is a circumferential length of the light region that is an object, and $\pi$ is a ratio of circumference of a circle to a diameter of the circle. Here, the circularity C is closer to 1 as the circle is closer to a perfect circle, and the value is smaller as the inspection object has a more distorted shape.

Furthermore, the circularity threshold $C_{TH}$ is a threshold arbitrarily set in advance to, for example, detect that micro chipping occurs in the flavor element 12 or that the shape of the flavor element 12 deviates from a spherical shape, and the threshold is set to be, for example, from 0.7 to 0.9. Consequently, if the circularity C of the flavor element 12 is less than the preset circularity threshold $C_{TH}$ (no in the step S9), it is determined that the shape of the flavor element 12 is not proper, and the element is determined as the no-good product (the step S7).

If the circularity C of the flavor element 12 is the circularity threshold $C_{TH}$ or more, it is determined that the shape of the flavor element 12 is proper (yes in the step S9). Thus, for the flavor element 12, the quantity determination means determines that the quantity N is proper, and the shape determination means determines that both the area S and the circularity C are proper, so that the element is determined as an okay (OK) product (step S10). In this way, the flavor element 12 has its quality evaluated as one of the no-good product and the okay product based on the inspection image 5, and the inspection program ends.

As described above, according to the cigarette filter inspection method of the present embodiment, even in a case where the flavor element 12 disposed in the filter component has the same color as in the filter component, the quantity and shape of the flavor elements 12 can be determined in accordance with a difference in luminance between the filter component and the flavor element 12 based on contrast in the inspection image 5. Consequently, the quality of the flavor element 12 can be determined. Furthermore, according to the cigarette filter inspection method of the present embodiment, the inspection is performed on the gray scale image having a smaller amount of data to be processed as compared with the color image processing. Therefore, amount of computer calculation can be saved, and a processing speed can increase.

Furthermore, according to the cigarette filter inspection method of the present embodiment, the lump of light region in the inspection image 5 subjected to the binarization processing can be detected as the flavor element 12, and hence the flavor element 12 can be detected through simple computation, which can contribute to the increase in the processing speed.

Additionally, according to the cigarette filter inspection method of the present embodiment, shape determination based on the area S and the circularity C is performed on the above-described lump of light region. Consequently, even when the flavor element 12 is not formed in a capsule and is formed by hardening the powder, detection accuracy can improve, for example, to comparatively small chipping or unevenness in a peripheral portion of the flavor element 12.

Furthermore, according to the cigarette filter inspection method of the present embodiment, the shape determination is performed based on a plurality of criteria comprising the area S and the circularity C. For example, an acceptable range of the circularity C is strictly set, while an acceptable range of the area S is loosely set. Consequently, various variations of criteria for quality determination can be set.

Second Embodiment

Description will be made as to a cigarette filter inspection method, a cigarette filter inspection apparatus, and a cigarette filter inspection program according to a second embodiment of the present invention. The second embodiment of the present invention is different from the above-described first embodiment in a part of an inspection program to be executed by the above image processing device 42. Hereinafter, respects different from those of the first embodiment will be described, and detailed description of the same respects as in the first embodiment is omitted.

Figure 8:
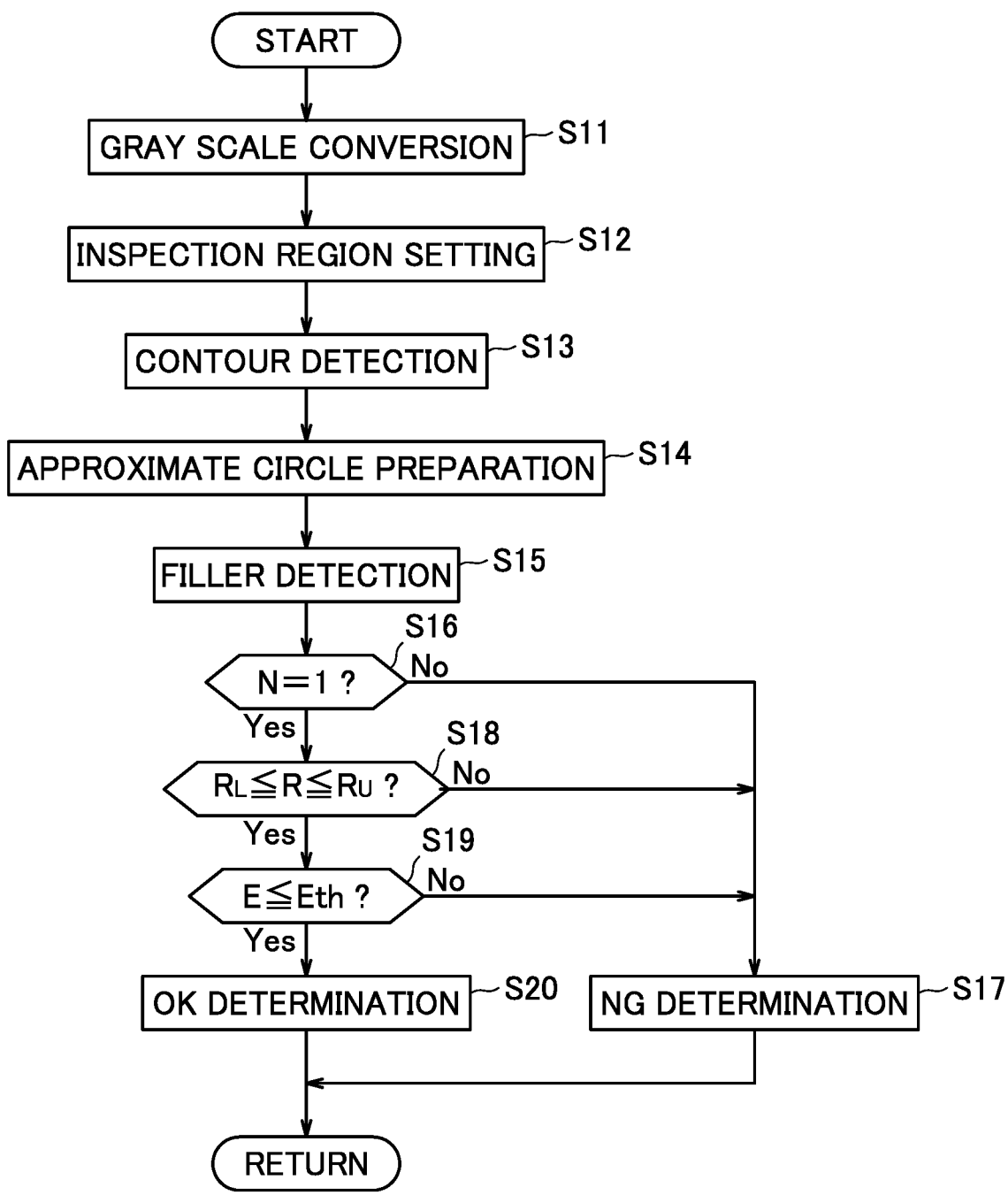
FIG. 8 is a flowchart showing execution procedures of an inspection program according to a second embodiment.

FIG. 8 is a flowchart showing execution procedures of the inspection program according to the second embodiment. The inspection program according to the second embodiment is the same as the inspection program according to the above-described first embodiment in terms of start conditions, gray scale conversion as step S11, and inspection region setting as step S12.

Upon completion of setting of an inspection region 50 in the step S12, edge detection is performed on the inspection region 50 in a gray scale image, to detect a contour 51 of a flavor element 12 in the inspection region 50 (step S13).

Figure 9:
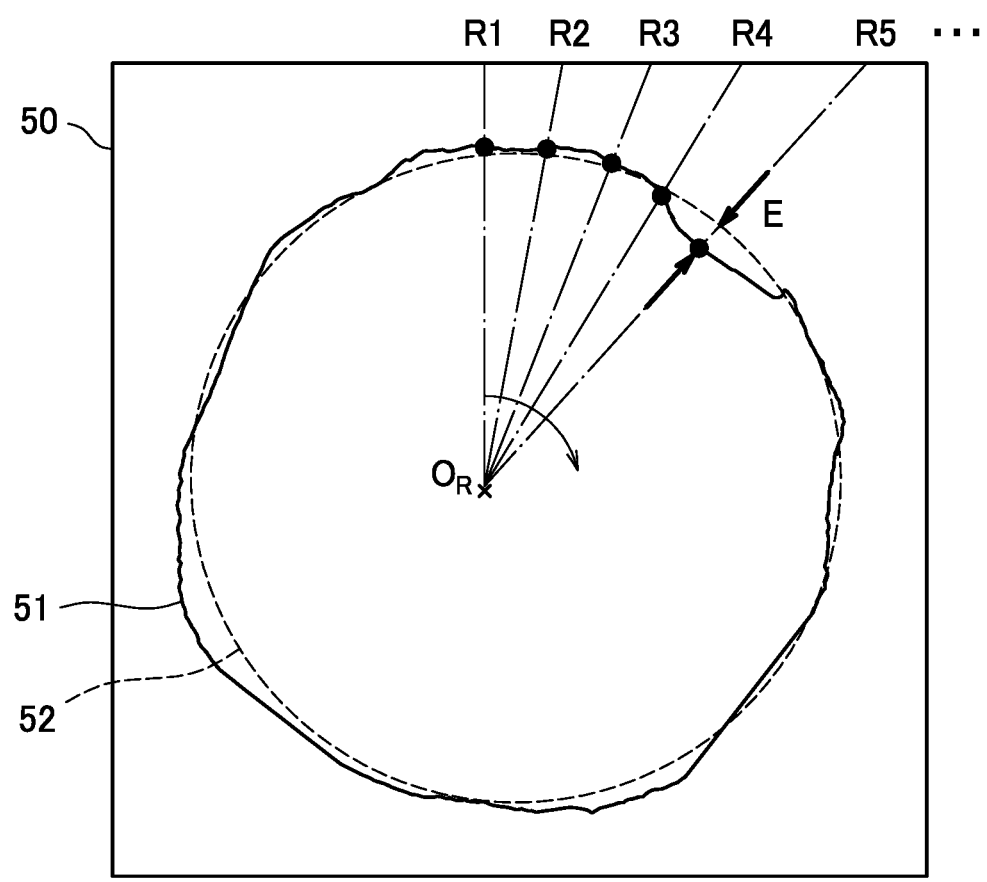
FIG. 9 is a conceptual diagram schematically showing an inspection logic according to the second embodiment.

FIG. 9 is a conceptual diagram schematically showing an inspection logic according to the second embodiment. The edge detection is performed by scanning a change point of a luminance on a line segment of a radiating direction around a temporarily set arbitrary point $O_R$. More specifically, in the present embodiment, for example, the contour 51 is extracted by detecting such change points of the luminance as shown by black circles in order from an outer periphery of the inspection region 50 toward a center point $O_R$ of an inspection image 5 on line segments shown by radiation lines R1, R2, . . . in FIG. 9. Here, for example, in the present embodiment, the change point of the luminance can be detected as a point at which the luminance changes as much as 30 or more shade levels on the above line segment. Furthermore, in the edge detection, a plurality of contours 51 may be detected, for example, in a case where a plurality of flavor elements 12 are arranged in a void 11 or in a case where the inspection region 50 includes micro noise.

If one or more contours 51 are detected in the step S13, an approximate circle 52 to be fitted in each of the contours 51 is prepared (step S14). More specifically, as shown in FIG. 9, the approximate circle 52 is specified as a circle having such a radius R as to minimize an error candidate $E_x$, the error candidate $E_x$ being calculated by summing distances over the circumference of the circle, each of the distances being between each of a plurality of luminance change points detected as the contour 51 in the step S13 and an approximate circle candidate having a radius Rx as a variable in each of radiation lines R1, R2, . . . . At this time, an approximate error E between the contour 51 and the approximate circle 52 is also specified. Note that a preparation method of the approximate circle 52 for the contour 51 is not limited to a fitting technique such as a least-square method described here, and various methods can be used.

Here, in a case where the inspection image 5 includes micro noise, a micro approximate circle 52 to be fitted in the noise is prepared. Consequently, if the radius R of the approximate circle 52 is less than a predetermined threshold radius $R_{TH}$, the approximate circle 52 is regarded as the noise and excluded from inspection objects. On the other hand, if the radius R of the approximate circle 52 is the threshold radius $R_{TH}$ or more, the contour 51 in which the approximate circle 52 is fitted is detected as the flavor element 12 (step S15, a filler detection step, or filler detection means). Then, in cases including a case where the flavor element 12 is not detected in the inspection region 50 and a case where a plurality of flavor elements 12 are detected, a quantity N of the flavor elements 12 is calculated. Note that the threshold radius $R_{TH}$ is a threshold arbitrarily set in advance in the same manner as in the "threshold area $S_{TH}$" in the above-described first embodiment.

Subsequently, quantity determination is performed on whether or not the quantity N of the flavor elements 12 in the inspection region 50 is 1 (step S16, a quantity determination step, or quantity determination means). That is, if a quantity N of the contours 51 detected as the flavor elements 12 is 1, it is determined that one flavor element 12 is only disposed in the void 11 and that the quantity N of the flavor elements 12 is proper.

On the other hand, if the quantity N is not 1 (no in step S16), for example, it is considered that the flavor element 12 is not in the void 11, the flavor element 12 is cracked into a plurality of elements, or one flavor element 12 and a fragment of another flavor element 12 are included. Thus, it is determined that the quantity of the flavor elements 12 is not proper, and the element is determined as a no-good (NG) product (step S17). When it is determined that the flavor element 12 is the no-good product, the inspection program for the inspection image 5 ends.

If it is determined that the quantity N of the flavor elements 12 in the inspection region 50 is proper (yes in the step S16), it is determined whether or not a shape of the flavor element 12 is proper, based on the radius R of the approximate circle 52 for the detected flavor element 12, and the approximate error E between the approximate circle 52 and the contour 51.

More specifically, it is first determined whether or not the radius R of the approximate circle 52 calculated in the step S14 is within a predetermined range set beforehand. That is, it is determined whether or not the radius R is a predetermined lower limit value $R_L$ or more and a predetermined upper limit value $R_U$ or less (step S18)

Here, a lower limit value $S_L$ and an upper limit value $S_U$ are thresholds arbitrarily set in advance to prescribe an acceptable range of a size of one flavor element 12. Consequently, if a radius R of an inspection object is not within a predetermined range set beforehand (no in the step S18), it is considered that the size of the flavor element 12 is not proper, and the element is determined as a no-good (NG) product (the step S17). The range defined by the lower limit value $S_L$ and the upper limit value $S_U$ is set to be, for example, from 80 to 120% of the prescribed radius of the flavor element 12.

Furthermore, if it is determined in the step S18 that the size of the flavor element 12 is proper (yes in the step S18), it is determined whether or not the approximate error E between the approximate circle 52 and the contour 51, the approximate circle 52 being calculated in the step S14, is not more than or equal to an arbitrary error threshold $E_{TH}$ set in advance to indicate that the shape of the flavor element 12 is acceptable (step S19). In the present embodiment, the error threshold $E_{TH}$ is set to, for example, 50.

If the approximate error E between the approximate circle 52 and the contour 51 is larger than the error threshold $E_{TH}$ (no in the step S19), it is considered that the flavor element 12 deviates from a spherical shape due to cracking or chipping. Thus, it is determined that the shape of the element is not proper, and the element is considered as the no-good product (the step S17).

On the other hand, if the approximate error E between the approximate circle 52 and the contour 51 is the error threshold $E_{TH}$ or less, it is determined that the shape of the flavor element 12 is proper (yes in the step S19). Consequently, it is determined that both the quantity N and the shape of the flavor elements 12 are proper, and the element is determined as an okay (OK) product (step S20). In this way, a quality of the flavor element 12 is evaluated as one of the no-good product and the okay product based on the inspection image 5, and the inspection program ends.

As described above, according to the cigarette filter inspection method of the present embodiment, even in a case where the flavor element 12 disposed in a filter component has the same color as in the filter component, the quantity and shape of the flavor elements 12 can be determined in accordance with a difference in luminance between the filter component and the flavor element 12 based on contrast in the inspection image 5. Consequently, the quality of the flavor element 12 can be determined. Furthermore, according to the cigarette filter inspection method of the present embodiment, the inspection is performed on the gray scale image having a smaller amount of data to be processed as compared with color image processing. Consequently, computer calculation can be saved, and a processing speed can increase.

Furthermore, according to the cigarette filter inspection method of the present embodiment, the contour 51 is detected through the edge detection, and hence the flavor element 12 can be detected without being affected by detection accuracy based on a threshold in a case where binarization processing is applied.

Additionally, according to the cigarette filter inspection method of the present embodiment, shape determination is performed based on the radius R and approximate error E of the approximate circle 52 fitted in the contour 51 described above. Consequently, even when the flavor element 12 is not formed in a capsule and is formed by hardening the powder, detection accuracy can improve, for example, to comparatively small chipping or unevenness in a peripheral portion of the flavor element 12.

Furthermore, according to the cigarette filter inspection method of the present embodiment, the shape determination is performed based on a plurality of criteria comprising the radius R and the approximate error E. For example, an acceptable range of the approximate error E is strictly set, while an acceptable range of the radius R is loosely set. Consequently, various variations of criteria for quality determination can be set.

As described above, in the present embodiment, the approximate circle 52 is prepared, in the step S14, for the contour 51 detected in the step S13, and the shape determination of the flavor element 12 is performed based on each of the radius R and the approximate error E of the approximate circle 52 in the step S18 and the step S19. On the other hand, instead of preparing the approximate circle 52 in the step S14, an error between the detected contour 51 and a reference circle having a predetermined radius prescribed as a prescribed dimension of the flavor element 12 may be calculated in the same manner as in the approximate error E in FIG. 9. In this case, it can be determined whether or not the size of the flavor element 12 is proper only in the error determination of the step S19, and hence the determination of the radius R in the step S18 can be omitted. That is, since the shape is determined based on the error between the contour 51 and the reference circle, it is possible to determine, by one computation, whether or not the dimension of the flavor element 12 is good, and whether or not the shape of the element including unevenness of the surface of the element is good.

Third Embodiment

Description will be made as to a cigarette filter inspection method, a cigarette filter inspection apparatus, and a cigarette filter inspection program according to a third embodiment of the present invention. The third embodiment of the present invention is different from the above-described first embodiment in terms of the color of the flavor element 12 in the above-described first embodiment, illumination light of an illumination device 41, and a part of the inspection program to be executed by an image processing device 42. Hereinafter, respects different from those of the first embodiment will be described, and the same configuration as in the first embodiment is denoted with common reference signs to omit detailed description.

In the third embodiment, in a case where a flavor element 17 of color different from color of outer filter wrapper 13 seen in the back of a void 11 is used as an inspection object, the illumination light of the illumination device 41 is set to complementary color of the color of the flavor element 17. For example, in the present embodiment, the flavor element 17 has a blue surface, and the illumination device 41 irradiates the void 11 with yellow illumination light. Here, a different color indicates that a color difference is 12 or more, for example, in a known L*a*b* color space.

Figure 10:
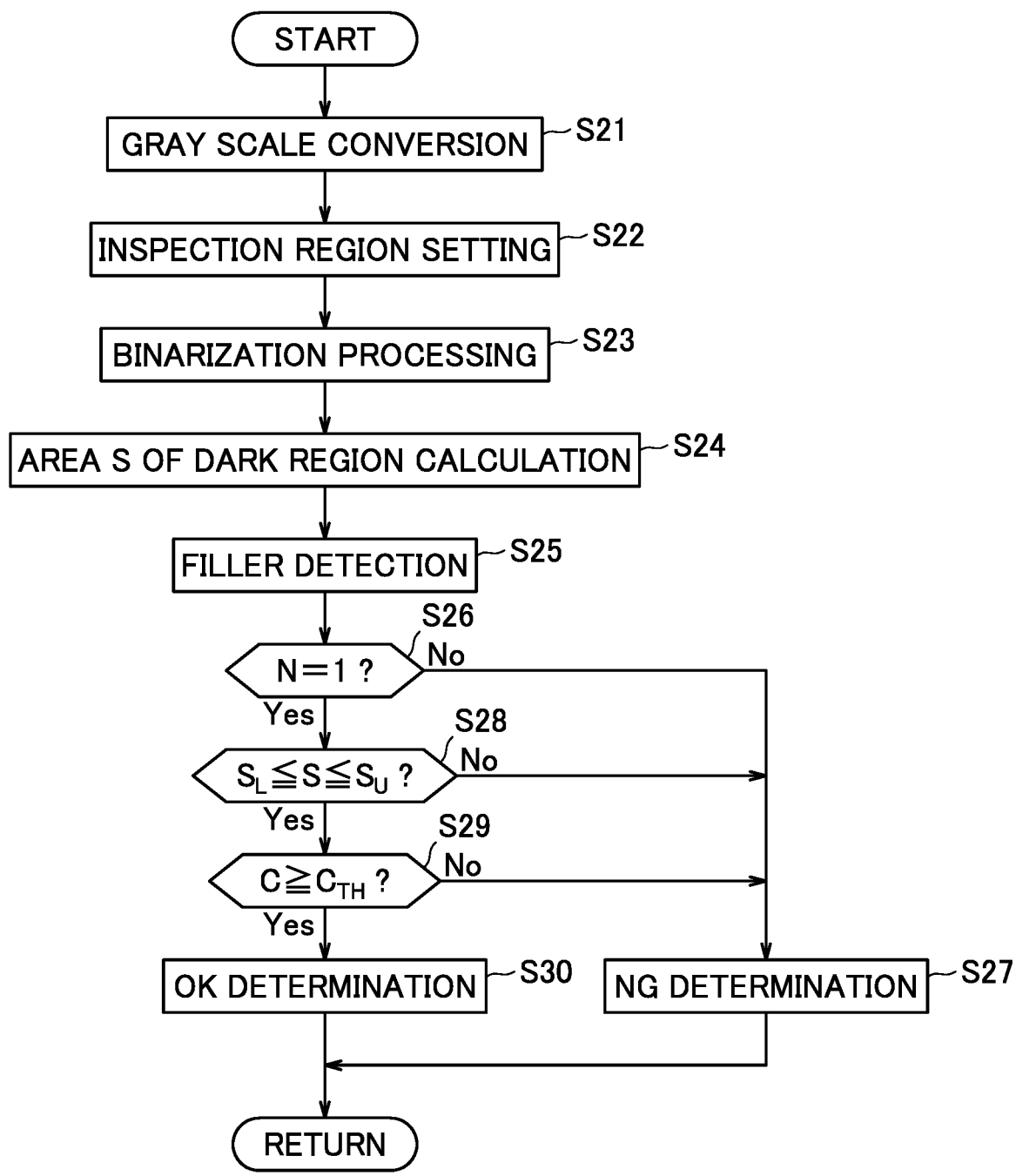
FIG. 10 is a flowchart showing execution procedures of an inspection program according to a third embodiment.

FIG. 10 is a flowchart showing execution procedures of the inspection program according to the third embodiment. The inspection program according to the third embodiment is the same as the inspection program according to the above-described first embodiment in terms of start conditions, gray scale conversion as step S21, and inspection region setting as step S22.

Figure 11:
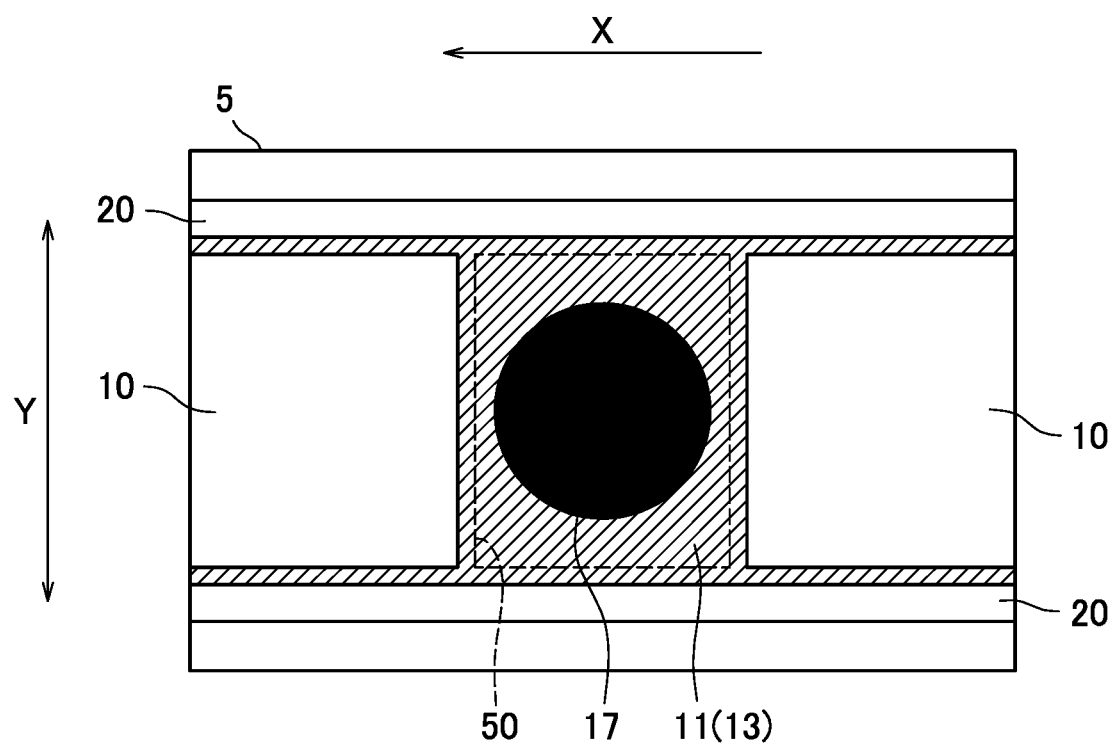
FIG. 11 is a schematic view showing an inspection image according to the third embodiment.

FIG. 11 is a schematic view showing an inspection image according to the third embodiment. The flavor element 17 in the void 11 has the blue surface and easily absorbs the illumination light of the yellow color that is the complementary color. Consequently, in the inspection image 5 converted to a gray scale image shown in FIG. 11, the flavor element 17 is relatively dark in contrast to the outer filter wrapper 13 in the void 11, and detection accuracy of a boundary between the paper and the element can increase.

Returning to FIG. 10, upon completion of the setting of an inspection region 50 in the step S22, binarization processing of setting, to 1, a light region having a complementary color threshold luminance $BC_{TH}$ or more and setting, to 0, a dark region having a luminance less than the complementary color threshold luminance $BC_{TH}$ is performed on the inspection region 50 in the gray scale image, to generate binary data (step S23).

Here, the complementary color threshold luminance $BC_{TH}$ may be set for each inspection image 5, and may be a fixed value that is set in advance. In the former case, the complementary color threshold luminance $BC_{TH}$ can be set as, for example, a value obtained by measuring, in advance, a minimum luminance $B_{MIN}$ in the inspection region 50 in a case where the flavor element 17 is not disposed in the void 11, and subtracting, from the minimum luminance $B_{MIN}$, a difference luminance obtained by subtracting the minimum luminance $B_{MIN}$ from an average luminance $B_A$ of the gray scale image in the inspection region 50 of the inspection image 5, that is, $BC_{TH}=2B_{MIN}-B_A$.

Subsequently, an area S of a lump of dark region included in the binary data is calculated (step S24). Here, if a plurality of lumps of dark regions are present, the area S is calculated for each of the plurality of dark regions.

Then, if the area S of the lump of dark region in the inspection region 50 is a threshold area $S_{TH}$ or more in the same manner as in the above-described first embodiment, the dark region is detected as the flavor element 17 (step S25, a filler detection step, or filler detection means). In cases including a case where the flavor element 17 is not detected and a case where a plurality of flavor elements are detected in the inspection region 50, a quantity N of the flavor elements is calculated.

The subsequent procedures are similar to those of the above-described first embodiment, and quantity determination of the flavor element 17 in the inspection region 50 (step S26), area determination of the flavor element 17 detected as the dark region (step S28) and circularity determination of the flavor element 17 (step S29) are performed. In this way, the flavor element 17 has its quality evaluated as one of a no-good product and an okay product based on the inspection image 5, and the inspection program ends.

As described above, according to the cigarette filter inspection method of the present embodiment, the inspection image 5 converted to the gray scale image is processed. Consequently, the inspection is performed on the gray scale image having a smaller amount of data to be processed as compared with color image processing. Therefore, computer calculation can be saved, and a processing speed can increase.

Furthermore, according to the cigarette filter inspection method of the present embodiment, the flavor element 17 having a colored surface is irradiated with the illumination light of the complementary color to the color of the flavor element 17. Consequently, edges of both the flavor element 17 and a filter component can stand out due to a difference in absorption rate of the illumination light between the element and the component, and inspection accuracy of the flavor element 17 can improve.

Furthermore, according to the cigarette filter inspection method of the present embodiment, the lump of dark region in the gray scale image subjected to the binarization processing can be detected as the flavor element 17, and hence the flavor element 17 can be detected through simple computation, which can contribute to the increase in the processing speed.

Additionally, according to the cigarette filter inspection method of the present embodiment, shape determination based on the area S and a circularity C is performed on the above-described lump of dark region. Consequently, even when the flavor element 17 is not formed in a capsule and is formed by hardening the powder, detection accuracy can improve, for example, to comparatively small chipping or unevenness in a peripheral portion of the flavor element 17.

As above, the description of the embodiments ends, and the present invention is not limited to the above-described embodiments. For example, in the above third embodiment, a quality inspection method of the flavor element 17 by inspection means similar to that of the first embodiment is illustrated in an aspect where the flavor element 17 having the colored surface is irradiated with the illumination light of the complementary color, but a quality inspection method of the flavor element 17 by inspection means similar to that of the second embodiment may be applied.

Furthermore, in the above respective embodiments, the shape of the flavor element 12 or 17 is illustrated as a sphere, but a shape of a solid filler is not limited to this shape, and can be variously changed to, for example, a cylindrical shape including opposite semispherical ends, a football type, a tablet shape including a disc type or a rectangular parallelepiped type, or the like. In this case, during inspection of a filler, for example, an ideal shape of the filler in an inspection image is stored as a reference shape in the image processing device 42, and a shape of the detected filler is compared with the reference shape, so that it can be determined whether or not the filler is good.

EXPLANATION OF REFERENCE SIGNS 5 inspection image
10 filter plug
11 void
12 flavor element
13 outer filter wrapper
41 illumination device
50 inspection region

The invention claimed is:

1. A cigarette filter inspection method of inspecting a solid filler to be disposed in a void between two members placed in an outer filter wrapper, the cigarette filter inspection method comprising:
   a first step of irradiating the void with illumination light,
   a second step of obtaining an inspection image of a region containing the void,
   a third step of detecting the filler based on contrast between the void and the filler in the inspection image,
   a fourth step of inspecting the filler detected in the inspection image and determining a single filler is in the void,
   determining an area of the filler and determine that the area falls within a predetermined range; and
   calculating a circumferential length of the filler,
   calculating the circularity of the filler using the equation $4\pi S/L^2$, where S is the area of the filler and L is the circumferential length of the filler, and
   determining whether the circularity of the filler is greater than a threshold value.

2. The cigarette filter inspection method according to claim 1, further comprising:
   a fifth step of setting an inspection region in the void in the inspection image, wherein in the third step, the filler is detected in the inspection region.

3. The cigarette filter inspection method according to claim 1, wherein in the third step, a lump of light region or dark region in the inspection image subjected to binarization processing is detected as the filler.

4. The cigarette filter inspection method according to claim 3, wherein in the binarization processing, a binarization threshold is set based on an average value of luminance in the inspection image.

5. The cigarette filter inspection method according to claim 1, wherein in the third step, the filler is detected based on a contour extracted from the inspection image through edge detection.

6. The cigarette filter inspection method according to claim 1, wherein in the first step, the void is irradiated with the illumination light from an illuminator formed in an annular shape to surround an angle of view in the imaging step.

7. The cigarette filter inspection method according to claim 1, wherein in the first step, the void is irradiated with illumination light of complementary color to color of the filler, in a case where color of the void is different from the color of the filler.

8. The cigarette filter inspection method according to claim 1, wherein the inspection image is obtained as a gray scale image of the region containing the void.

9. A cigarette filter inspection apparatus that inspects a solid filler to be disposed in a void between two members placed in outer filter wrapper, the cigarette filter inspection apparatus comprising:
   an illuminator that irradiates the void with illumination light,
   an imager that obtains an inspection image of a region containing the void, and
   an image processor including a filler detector for detecting the filler based on contrast between the void and the filler in the inspection image, and an inspector for inspecting the filler detected in the inspection image, and
   a computing unit configured to:
      determine a single filler is in the void,
      determine an area of the filler and determine that the area falls within a predetermined range; and
      calculate a circumferential length of the filler,
      calculate the circularity of the filler using the equation $4\pi S/L^2$, where S is the area of the filler and L is the circumferential length of the filler, and
      determine whether the circularity of the filler is greater than a threshold value.

10. The cigarette filter inspection apparatus according to claim 9, wherein the image processor comprises an inspection region setter for setting an inspection region in the void in the inspection image, and wherein the filler detector detects the filler in the inspection region.

11. The cigarette filter inspection apparatus according to claim 9, wherein the filler detector detects, as the filler, a lump of light region or dark region in the inspection image subjected to binarization processing.

12. The cigarette filter inspection apparatus according to claim 11, wherein in the binarization processing, a binarization threshold is set based on an average value of luminance in the inspection image.

13. The cigarette filter inspection apparatus according to claim 9, wherein the filler detector detects the filler based on a contour extracted from the inspection image through edge detection.

14. The cigarette filter inspection apparatus according to claim 9, wherein the illuminator has a shape formed in an annular shape to surround an angle of view in the imager.

15. The cigarette filter inspection apparatus according to claim 9, wherein the illuminator irradiates the void with illumination light of complementary color to color of the filler, in a case where color of the void is different from the color of the filler.

16. The cigarette filter inspection apparatus according to claim 9, wherein the inspection image is obtained as a gray scale image of the region containing the void.

17. A non-transitory cigarette filter inspection program to inspect a solid filler to be disposed in a void between two members placed in outer filter wrapper, the cigarette filter inspection program causing a computer to execute:
   a first step of obtaining an inspection image of a region containing the void,
   a second step of detecting the filler based on contrast between the void and the filler in the inspection image, and
   a third step of inspecting the filler detected in the inspection image and determining a single filler is in the void,
   determining an area of the filler and determine that the area falls within a predetermined range; and
   calculating a circumferential length of the filler,
   calculating the circularity of the filler using the equation $4\pi S/L^2$, where S is the area of the filler and L is the circumferential length of the filler, and
   determining whether the circularity of the filler is greater than a threshold value.

18. The cigarette filter inspection program according to claim 17, further comprising:
   a fourth step of setting an inspection region in the void in the inspection image, wherein the second step comprises detecting the detecting the filler in the inspection region.

19. The cigarette filter inspection program according to claim 17, wherein the second step comprises detecting, as the filler, a lump of light region or dark region in the inspection image subjected to binarization processing.

20. The cigarette filter inspection program according to claim 19, wherein in the binarization processing, a binarization threshold is set based on an average value of luminance in the inspection image.

21. The cigarette filter inspection program according to claim 17, wherein the second step comprises detecting the filler based on a contour extracted from the inspection image through edge detection.

22. The cigarette filter inspection program according to claim 17, wherein the inspection image is obtained as a gray scale image of the region containing the void.

* * * * *